(12) United States Patent
Saunders et al.

(10) Patent No.: US 6,608,866 B1
(45) Date of Patent: Aug. 19, 2003

(54) DIGITAL VIDEO PROCESSING

(75) Inventors: Nicholas Ian Saunders, Basingstoke (GB); Clive Henry Gillard, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/338,710

(22) Filed: Jun. 23, 1999

(30) Foreign Application Priority Data

Jun. 25, 1998 (GB) ............................................. 9813780

(51) Int. Cl.$^7$ ............................. H04B 1/66; H04N 7/12; G06K 9/36
(52) U.S. Cl. ................................................ 375/240.16
(58) Field of Search ...................... 375/240.01, 240.13, 375/240.16, 240.17, 240.24, 240.25, 240.26; 348/402.1, 407.1, 413.1, 416.1, 419.1, 420.1, 425.1, 431.1, 699; 382/232, 236, 253; 386/109

(56) References Cited

U.S. PATENT DOCUMENTS

| | | | | |
|---|---|---|---|---|
| 4,864,394 A | * | 9/1989 | Gillard | 375/240.17 |
| 5,398,068 A | * | 3/1995 | Liu et al. | 375/240.16 |
| 6,058,143 A | * | 5/2000 | Golin | 375/240.16 |
| 6,118,928 A | * | 9/2000 | Kawakami et al. | 386/109 |
| 6,141,447 A | * | 10/2000 | Linzer et al. | 382/236 |
| 6,160,844 A | * | 12/2000 | Wilkinson | 375/240 |
| 6,278,736 B1 | * | 8/2001 | De Haan et al. | 375/240.16 |

FOREIGN PATENT DOCUMENTS

| | | |
|---|---|---|
| EP | 0 942 605 | 9/1999 |
| GB | 2 318 246 | 4/1998 |
| WO | WO 99 43162 | 8/1999 |

OTHER PUBLICATIONS

Tudor P N et al: "Real–Time Transcoding of MPEG–2 Video Bit Streams" International Broadcasting Convention, GB, London, No. 447, Sep. 1, 1997, pp. 296–301, COMPL, XP000668774.

Bjoerk N et al: "Transcoder Architectures for Video Coding" IEEE Transactions on Consumer Electronics, IEEE Inc. New York, US, vol. 44, No. 1, Feb. 1, 1998 pp. 88–98, XP000779254 ISSN: 0098–3063.

Keesman G et al: "Transcoding of MPEG bitstreams" Signal Processing. Image Communication, NL, Elsevier Science Publishers, Amsterdam, vol. 8, No. 6, Sep. 1, 1996, pp. 481–500, XP004047113 ISSN:0923–5965.

* cited by examiner

*Primary Examiner*—Gims S. Philippe
(74) *Attorney, Agent, or Firm*—Frommer Lawrence & Haug LLP; William S. Frommer; Bruno Polito

(57) ABSTRACT

A digital video processing system and method for deriving an output compressed video signal from an input compressed video signal. The input compressed video signal represents successive input pictures. Subsets of the input pictures are derived from other input pictures according to input picture motion vectors corresponding to a repetitive GOP (Group of Pictures) structure. The output compressed video signal represents successive output pictures, subsets of the output pictures being derived from other output pictures according to output picture motion vectors corresponding to a repetitive GOP structure that is different from, or not picture-aligned with, the GOP structure of the input compressed video signal. The output picture motion vectors are derived from the input picture motion vectors.

14 Claims, 5 Drawing Sheets

DIGITAL VIDEO PROCESSING

BACKGROUND OF THE INVENTION

1. Field of the Invention

This invention relates to digital video processing.

2. Description of the Prior Art

The transmission or storage of video signals commonly makes use of data compression, whereby a digital representation of a video signal is compressed so that it can be transmitted or stored at a lower bit rate, only to be decompressed on reception or retrieval. This conserves (expensive) storage or transmission bandwidth.

Data compression can generate compressed data streams with various bit rates. However, compressed video data can only be decompressed at the rate at which it was compressed. This means that a change in the compressed bit rate would require a compressed video sequence to be decompressed to the full video bandwidth, before being compressed again at the new data rate.

This is undesirable because of the hardware required to achieve this would make it impractical in most situations.

These problems are particularly severe in compression systems such as MPEG which use so-called groups of pictures (GOPs) in which one picture (an "I" picture) is compressed independently of the other pictures (so-called intra-frame or intra-field compression), and other pictures within the GOP are compressed by predicting their image content from one or more I pictures or from one or more "P" pictures, which in turn are predicted from one or more I pictures. Motion vectors may be used to help predict parts of the pictures from the correct parts of the I or P pictures. However, the motion vector generation process is very hardware-intensive.

Once again, in order to change from one GOP structure to another GOP structure requires a full decompression followed by a full recompression into the new GOP structure. Problems can also occur when a video data stream has to be switched from one compressed source to another, even if the bit rate does not have to be changed—for example during editing or on switching to advertisements during a broadcast programme.

SUMMARY OF THE INVENTION

This invention provides digital video processing apparatus in which an output compressed video signal is derived from an input compressed video signal;

the input compressed video signal representing successive input pictures, in which a subset of the pictures are derived from other input pictures in accordance with a repetitive group of pictures (GOP) structure, using input picture motion vectors;

the output video signal representing successive output pictures, in which a subset of the pictures are derived from other pictures in accordance with a repetitive group of pictures (GOP) structure different to or not picture-aligned with that of the input compressed video signal, using output picture motion vectors;

the apparatus comprising a motion vector processor for deriving the output picture motion vectors from the input picture motion vectors.

The invention recognises that instead of having to perform another full vector estimation process to change from one GOP structure or alignment to another, motion vectors for use in the output GOP structure can be derived from the motion vectors of the input GOP structure. In many cases, vectors needed in the output signal may not exist in the input signal, but these can (for example) be extrapolated from suitably chosen vectors provided for other pictures of the input signal.

The invention also provides a method of digital video processing in which an output compressed video signal is derived from an input compressed video signal;

the input compressed video signal representing successive input pictures, in which a subset of the pictures are derived from other input pictures in accordance with a repetitive group of pictures (GOP) structure, using input picture motion vectors;

the output video signal representing successive output pictures, in which a subset of the pictures are derived from other pictures in accordance with a repetitive group of pictures (GOP) structure different to or not picture-aligned with that of the input compressed video signal, using output picture motion vectors;

the method comprising deriving the output picture motion vectors from the input picture motion vectors.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
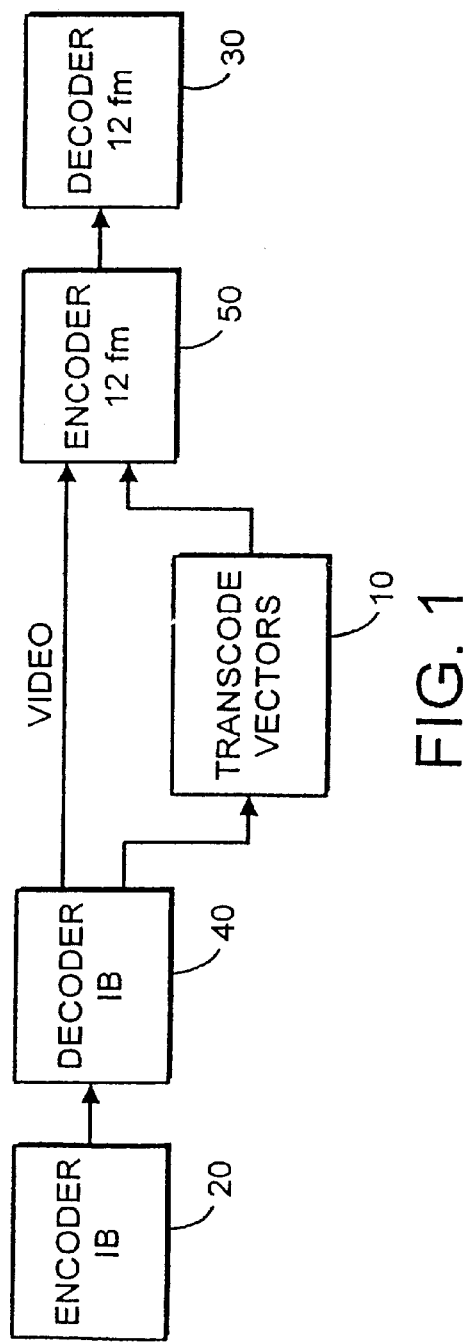
FIG. 1 is a schematic diagram of a motion vector transcoding apparatus.

Referring now to FIG. 1, a motion vector transcoding apparatus 10 is illustrated in the context of a system for converting compressed video signals in an "IB" GOP format (generated by an IB encoder 20) into a 12-frame GOP format (IBBPBBPBBPBB) suitable for decoding by a 12-frame decoder 30.

In general, an IB decoder 40 strips the motion vectors from the IB video data stream, and supplies the vectors to the transcoding apparatus 10 along with timing or frame identifying information. A 12-frame encoder 50 recombines the transcoded vectors with the video information to form the output 12-frame compressed data stream.

Figure 2:
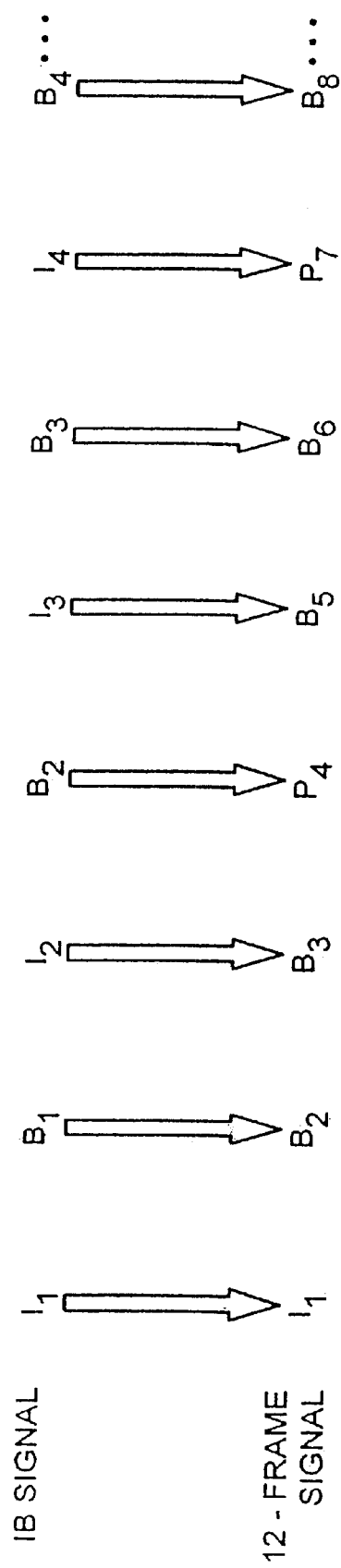
FIG. 2 illustrates the requirements of an example vector transcoding process.

FIG. 2 is a schematic diagram illustrating the requirements of the vector transcoding process.

Referring to FIG. 2, successive frames of an IB compressed video signal are shown on an upper row, together with the corresponding frames in a 12-frame GOP sequence of a 12-frame compressed video signal on a lower row.

In terms of each frame, it can be seen that a first I frame of the IB signal ($I_1$) has to be converted to a first I frame of the 12-frame signal (also $I_1$); a first B frame ($B_1$) of the IB signal has to be converted to a first B frame ($B_2$) of the 12-frame signal; a second I frame of the IB signal ($I_2$) has to be converted to a second B frame of the 12-frame signal ($B_3$) and so on.

The way in which these conversions affect the vector dependencies of the various frames will be discussed below. First, however, the way in which the actual video content of the frames must be changed will be discussed.

In general, an I (or "intra") frame is encoded with reference only to itself.

A P (or "predicted") frame is encoded with reference to the nearest previous I or P frame. A P frame comprises a set of motion vectors and difference data. The motion vectors define the motion of various parts of the reference frame so that an approximate version of the P frame can be constructed by translating the parts of the reference frame along those motion vectors. The difference data corrects for (at least some of) the errors introduced by such a coarse approximation to the content of the P frame.

A B ("bidirectional") frame is similar to a P frame, in that it is predicted with reference to one or two surrounding I or P frames, and in that it comprises vector and difference information. However, a B frame is generally compressed more harshly than a P frame, and a B frame can never serve as a reference for the compression of another frame.

Although B frames are referred to as "bidirectional", in that they can use I or P frames on both sides as references, this is not compulsory. It is quite permissible that a B frame may use only a previous frame, or only a following frame, as a reference.

So, in the example shown in FIG. 2, there are several permutations of conversions that are required in order to transform the IB GOP structure into a 12-frame GOP structure:

Converting an I frame to a B frame

Converting a B frame to a P frame

Converting an I frame to a P frame

Converting a B frame to another B frame with different reference frames

To convert between these frames, the video is decoded (e.g. by the decoder 40 in FIG. 1) and then re-encoded (e.g. by the encoder 50 in FIG. 1) using the transcoded vectors.

Transcoding the vectors therefore saves having to generate a set of motion vectors using, for example, a block matching process. In a typical video compression apparatus, block matching and vector estimation and selection can be very processing-intensive operations indeed, requiring large amounts of processing hardware and memory. So, avoiding the need to use block matching to generate a new set of vectors for use by the encoder 50 can save a significant amount of hardware.

So, in terms of converting, say, an I frame to a B frame, the actual difference data of the B frame can be constructed conventionally from the version of that frame output by the decoder 40. It is the vectors which must be generated by the transcoding process, as the original I frame did not have any associated motion vectors. The requirements for the output motion vectors from the transcoding apparatus will now be described in detail with reference to FIGS. 3a to 3c.

Figure 3A:
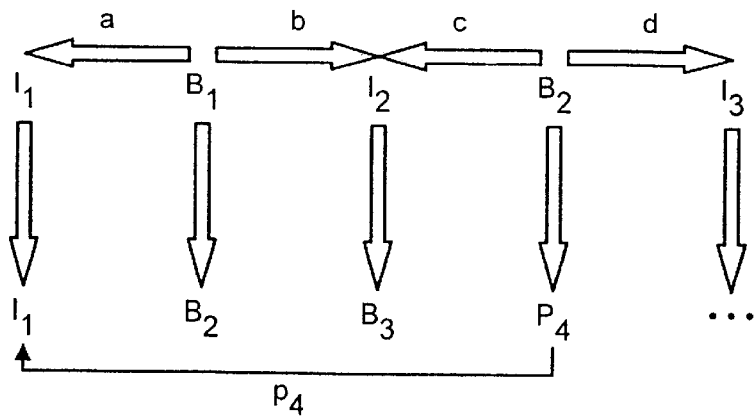
FIGS. 3a to 3c are schematic diagrams illustrating a vector transcoding process.
Figure 3B:
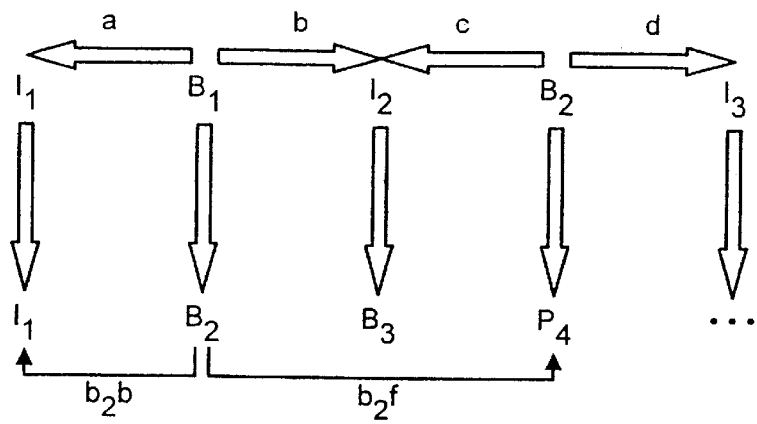
Figure 3C:
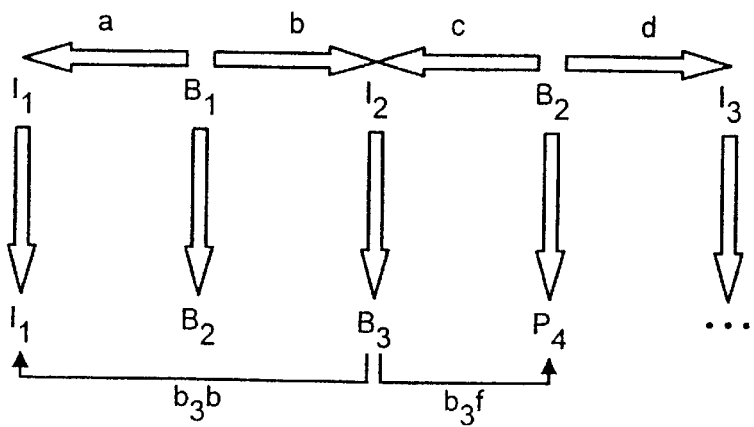

Referring to FIGS. 3a to 3c, the top line of each Figure illustrates the first few frames in the IB input signal, namely $I_1$, $B_1$, $I_2$, $B_2$ and so on. These are to be converted to respective frames $I_1$, $B_2$, $B_3$, $P_4$ and so on of the 12-frame GOP signal.

In the IB signal, motion vectors may be provided as follows:

vectors a are backward vectors pointing from $B_1$ to $I_1$ vectors b are forward vectors pointing from $B_1$ to $I_2$ vectors c are backward vectors pointing from $B_2$ to $I_2$ vectors d are forward vectors pointing from $B_2$ to $I_3$ although in some cases, or perhaps for some blocks of pixels within a B frame, one of the sets of forward and backward vectors may not be present.

FIG. 3a illustrates the vectors $p_4$ which are required to encode the new frame $P_4$ of the 12-frame GOP.

FIG. 3b illustrates the backward vectors $b_2b$ (pointing to $I_1$) and the forward vectors $b_2f$ (pointing to $P_4$) which are required to encode the new frame $B_2$ of the 12-frame GOP.

FIG. 3c illustrates the backward vectors $b_3b$ (pointing to $I_1$) and the forward vectors $b_3f$ (pointing to $P_4$) which are required to encode the new frame $B_3$ of the 12-frame GOP.

Two modes of operation of the vector transcoder will now be described, in terms of the way in which the vector transcoder operates to derive the required vectors $p_4$, $b_2b$, $b_2f$, $b_3b$ and $b_3f$. These modes of operation will be referred to as directionally-based operation and positionally-based operation respectively. In each mode, several derivations are defined to obtain the missing motion vectors from motion vectors that are present. The two modes refer to different priority orders for the way in which the transcoder selects which of these choices of derivations should be used first if the source vectors for that derivation are available.

While this description relates to frame-based operation, the same techniques can of course be applied in an analogous way to field-based operation, with the possible difference that the scaling applied to the vectors during the transcoding process may be altered to cater for the different temporal separation of fields compared to frames.

Directionally-based Operation

In this mode the first choice of the transcoding operation is to use vectors with the same temporal direction as the required vector. The algorithm used is as follows:

| | | |
|---|---|---|
| $p_4$ | If vector c exists: | $p_4 = 3 * c$ |
| | Else if vector a exists: | $p_4 = 3 * a$ |
| | Otherwise use: | $p_4 = 3 * -d$ |
| $b_2b$ | If vector a exists: | $b_2b = a$ |
| | Else if vector c exists: | $b_2b = c$ |
| | Otherwise use: | $b_2b = -b$ |
| $b_2f$ | If vector b exists: | $b_2f = 2 * b$ |
| | Else if vector d exists: | $b_2f = 2 * d$ |
| | Otherwise use: | $b_2f = -2 * a$ |
| $b_3b$ | If vector a exists: | $b_3b = 2 * a$ |
| | Else if vector c exists: | $b_3b = 2 * c$ |
| | Otherwise use: | $b_3b = -2 * b$ |
| $b_3f$ | If vector d exists: | $b_3f = d$ |
| | Else if vector b exists: | $b_3f = b$ |
| | Otherwise use: | $b_3f = -c$ |

As a first choice, the corresponding vector for the nearest input B frame is selected and scaled appropriately. If this is not available, the next adjacent B frame is examined and its vector used after scaling. If a vector is still not found, the most appropriate vector that points in the opposite direction is chosen and scaled.

When the transcoded vectors are used to re-encode the video signal into the 12-frame format, the encoder is also given the choice of a zero motion vector. If this were not provided, serious coding errors could occur if the transcoded vector simply was not suitable for the picture content of the new frame; such errors require large amounts of difference data in the encoded signal to correct.

Positionally-based Operation

In this mode, the first choice of the transcoding operation is to use vectors with the same spatial position as the required vector. The algorithm used is as follows:

| | | |
|---|---|---|
| $p_4$ | If vector c exists: | $p_4 = 3 * c$ |
| | Otherwise use: | $p_4 = 3 * -d$ |
| $b_2b$ | If vector a exists: | $b_2b = a$ |
| | Otherwise use: | $b_2b = -b$ |
| $b_2f$ | If vector:b exists: | $b_2f = 2 * b$ |
| | Otherwise use: | $b_2f = -2 * a$ |
| $b_3b$ | If vector b exists: | $b_3b = -2 * b$ |
| | Otherwise use: | $b_3b = 2 * c$ |
| $b_3f$ | If vector c exists: | $b_3f = -c$ |
| | Otherwise use: | $b_3f = b$ |

In the case where a source vector is not available, the most appropriate vector that points in the opposite direction is chosen and scaled accordingly. This algorithm makes use of the fact that each block in a B frame will always have at least one of a forward and a backward pointing vector associated with it. Again, the zero motion vector can be presented to the 12-frame encoder as an alternative vector choice in encoding.

Figure 4:
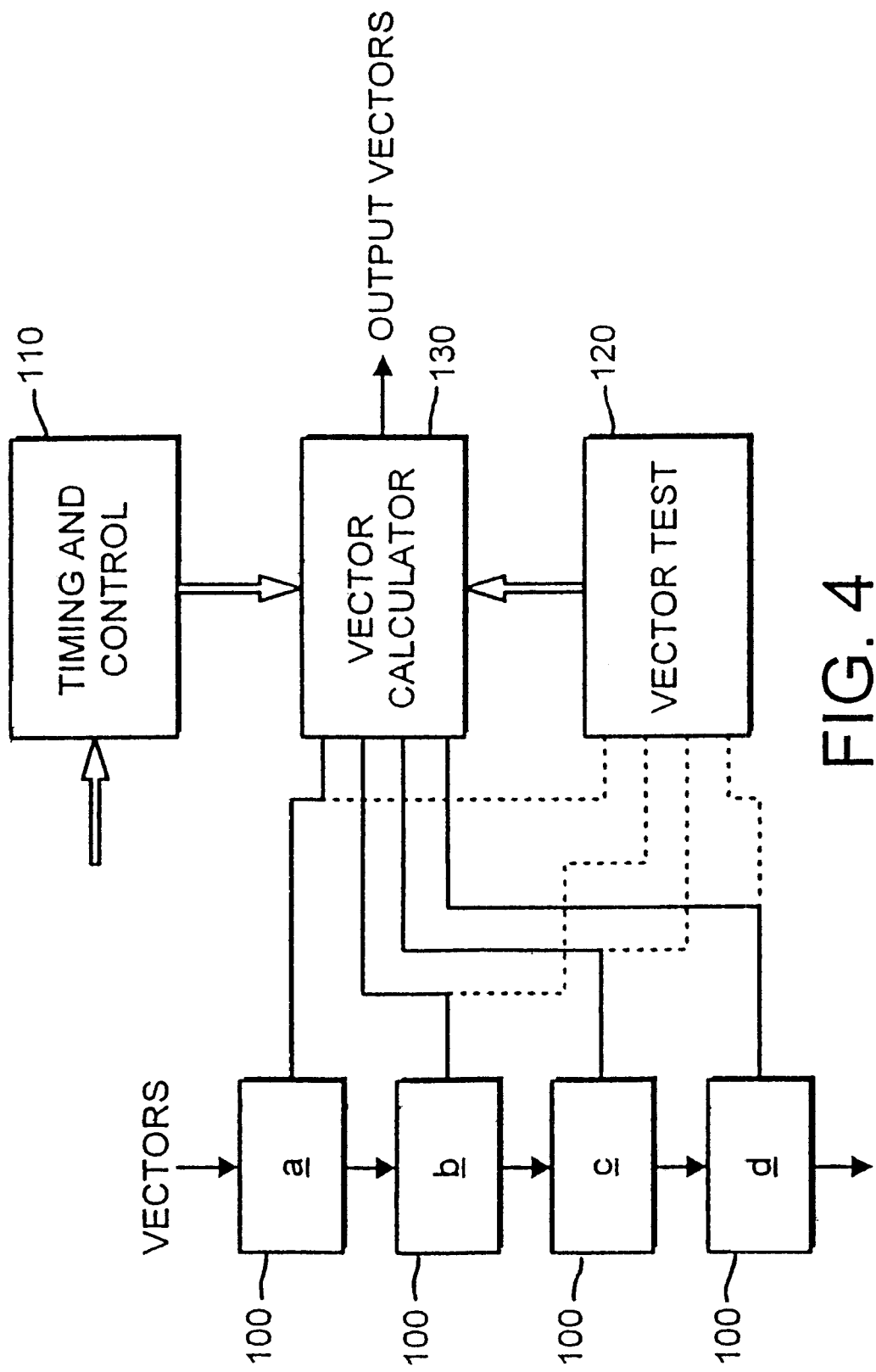
FIG. 4 is a more detailed schematic diagram of part of the apparatus of FIG. 1.

FIG. 4 is a more detailed schematic diagram of the vector transcoder 10 of FIG. 1 to illustrate the implementation of the operation described above.

In FIG. 4, successive motion vectors of the IB input sequence (e.g the sets of motion vectors a, b, c and d) are buffered in respective buffer stores 100. A timing and control unit 110 receives data specifying the position in the input and output frame sequence.

A vector tester 120 ascertains, for each block of the output frames, which of the possible vectors are present in the input signal. This information is passed to a vector calculator which calculates the output vectors in accordance with one of the algorithms described above, in dependence on which source vectors are available.

Figure 5:
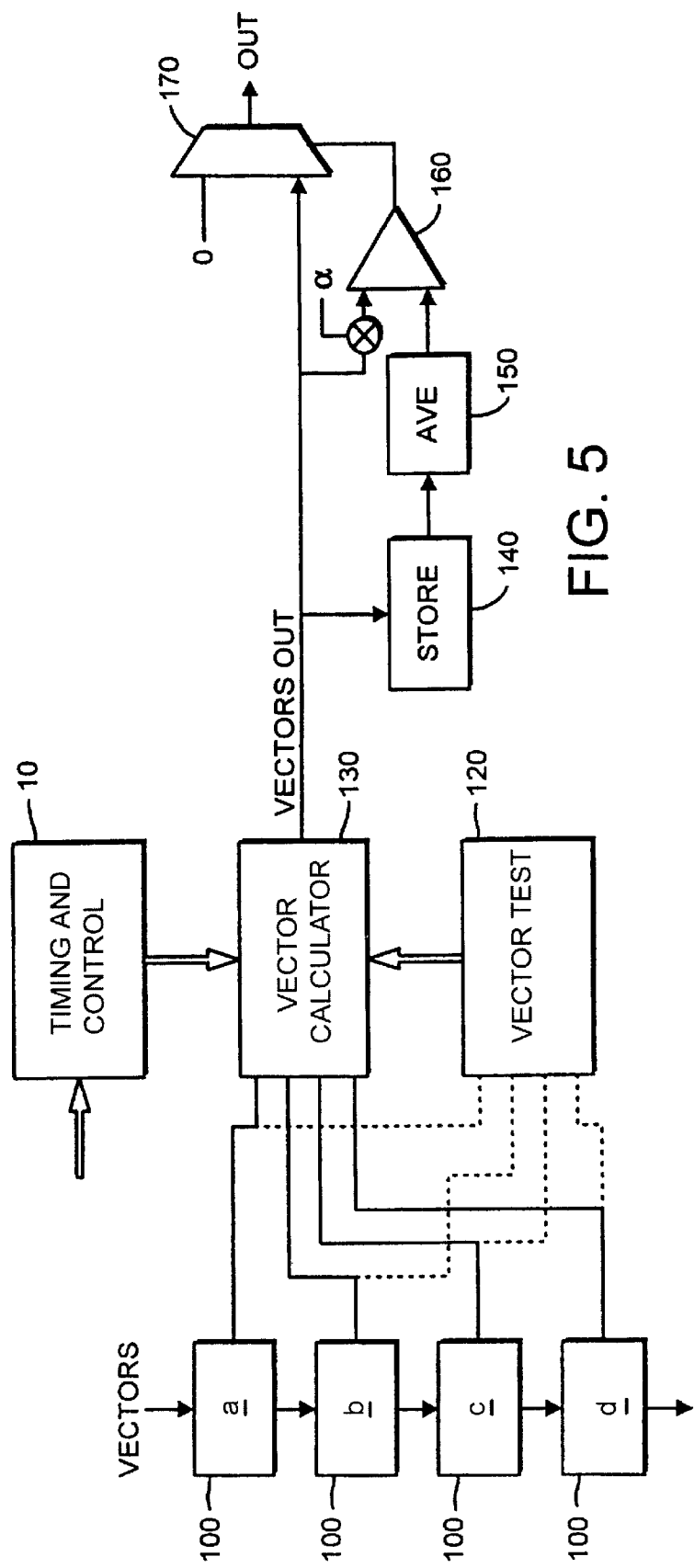
FIG. 5 illustrates a modification of the apparatus of FIG. 4 to provide a limiting function for transcoded vectors.

FIG. 5 illustrates a modification of the apparatus of FIG. 4 to provide a limiting function for transcoded vectors. The vectors output by the vector calculator 130 are buffered in a store 140 so as to store several vectors at nearby frame positions to the current output vector. these nearby vectors' magnitudes are averaged by an averager 150, and this average is compared 160 with a multiple α (e.g. 0.8) of the current output vector's magnitude. So, if the current vector is more than, say, 20% greater in magnitude than the average of surrounding vectors, it may be considered erroneous and be replaced (using a multiplexer 170) by the zero motion vector. In an alternative embodiment, the "large" transcoded vector could be limited rather than replaced by the zero motion vector.

In a further alternative embodiment, the "large" transcoded vector can be replaced by a nearby vector or a global motion vector.

Figure 6:
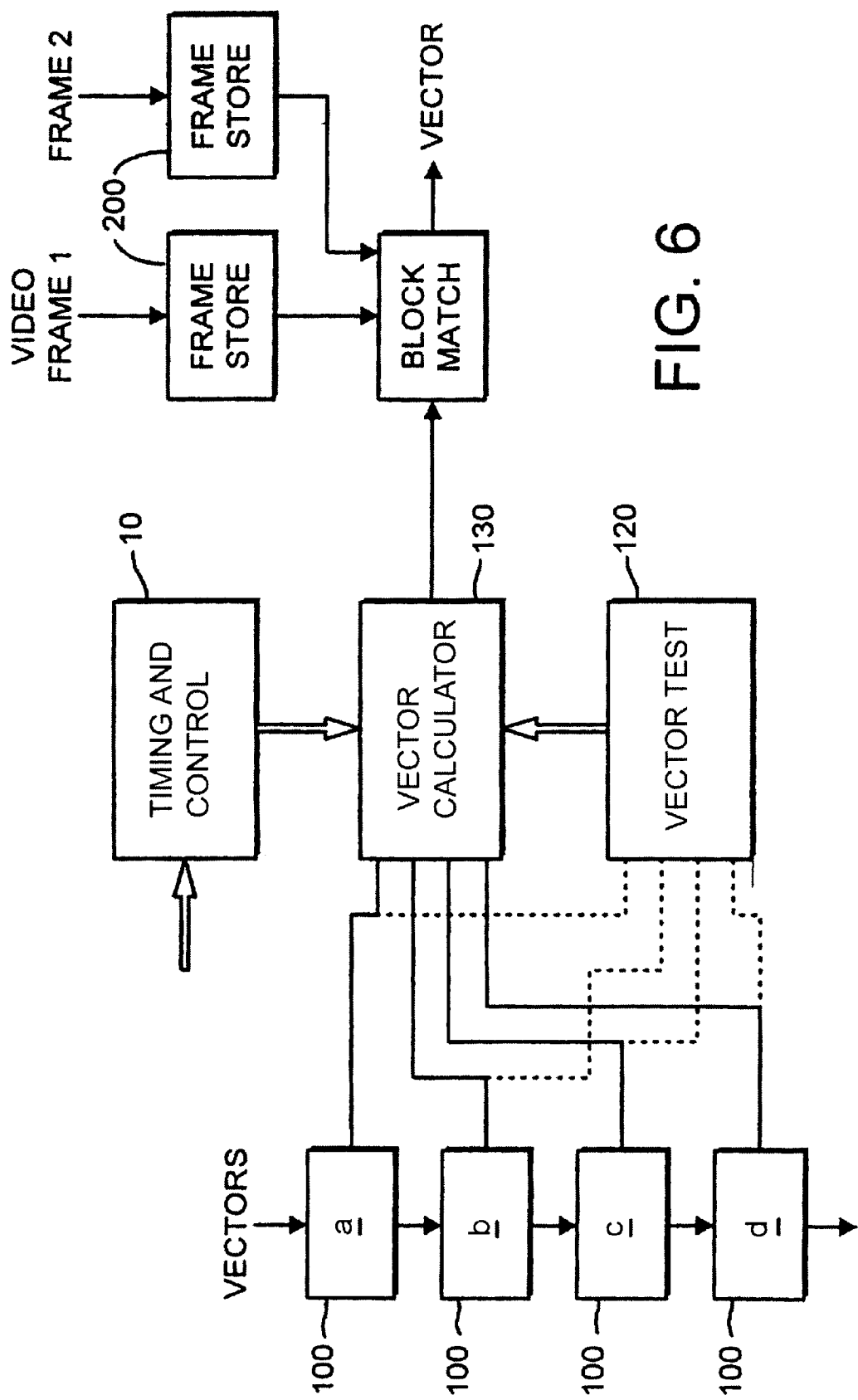
FIG. 6 illustrates a further modification of the apparatus of FIG. 4 to provide partial motion estimation around the transcoded motion vectors.

FIG. 6 illustrates a further modification of the apparatus of FIG. 4 to provide partial motion estimation around the transcoded motion vectors.

During the transcoding process, source motion vectors often have to be scaled—so that they point to the correct frame or field. At best the source vectors are generally available to half-pixel accuracy, but even this level of accuracy can be lost in the scaling process.

To alleviate this problem, a small vector estimator can be used to perform a block match search over a small area centred around the scaled transcoded vector. The position of maximum correlation found in this search is then used to correct the transcoded vector.

A search range of 2.0 pixels in 0.5 pixel steps is sufficient to regain the accuracy lost in the scaling process, perhaps using a 16×16 block of pixels.

Although the vector transcoding process according to this modified embodiment does now involve a block match operation, the operation is on a much smaller scale than that required to generate the vectors from the input frames alone, and so there is still a saving in hardware over a system involving a complete decode/recode.

In FIG. 6 there are shown two video frame stores 200 (or, in practice, partial frame stores) to receive and store pixels of the decoded video output by the IB decoder 40. A block matcher 210, operating in accordance with established techniques of block matching, tests the correlation of 16×16 blocks of pixels around the frame positions pointed to by the vector under test. The block position giving the best correlation is used to generate the corrected motion vector.

Features of FIG. 6 may of course be combined with features described with reference to FIG. 5.

Although the preferred embodiment has been described with reference to converting an IB GOP structure to a 12-frame structure, it will be appreciated that analogous techniques could be used to derive motion vectors for any output GOP structure from any input GOP structure. Indeed, the output GOP structure could simply be a frame-shifted version of the input GOP structure (e.g. two non-aligned 12-frame GOP structures).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Digital video processing apparatus in which an output compressed video signal is derived from an input compressed video signal;

(i) said input compressed video signal representing successive input pictures, in which subsets of the pictures are derived from other input pictures in accordance with a repetitive group of pictures (GOP) structure, using input picture motion vectors;

(ii) said output video signal representing successive output pictures, in which subsets of said pictures are derived from other pictures in accordance with a repetitive GOP structure different to or not picture-aligned with that of said input compressed video signal, using output picture motion vectors;

said apparatus comprising a motion vector processor for deriving said output picture motion vectors from said input picture motion vectors and a motion vector tester for comparing magnitudes of respective motion vectors output by said motion vector processor with a test magnitude;

whereby said test magnitude is an average magnitude of a plurality of motion vectors associated with surrounding picture areas; and whereby said comparing includes determining whether the magnitudes of said output picture motion vectors differ from said average magnitude by more than a predetermined percentage.

2. Apparatus according to claim 1, in which said motion vector processor is operable to extrapolate motion vectors required for pictures of said output video signal from motion vectors associated with pictures of said input video signal.

3. Apparatus according to claim 2, in which said motion vector processor is operable to extrapolate a motion vector required for a picture of the output video signal from a motion vector of said input video signal having said same forward or backward direction as said required motion vector of said output video signal.

4. Apparatus according to claim 2, in which said motion vector processor is operable to extrapolate a motion vector required for a picture of said output video signal from a motion vector of said input video signal associated with a picture of said input video signal at a corresponding temporal position to that picture of said output video signal.

5. Apparatus according to claim 1, in which said motion vector tester is operable to replace a motion vector having a magnitude greater than said test magnitude with the zero motion vector.

6. Apparatus according to claim 1, in which said motion vector tester is operable to replace a motion vector having a magnitude greater than said test magnitude with a motion vector associated with a nearby picture area.

7. Apparatus according to claim 1, in which said motion vector tester is operable to reduce the magnitude of a motion vector having a magnitude greater than said test magnitude.

8. Apparatus according to claim 1, comprising a correlation detector for detecting correlation of blocks of pixels pointed to by a motion vector generated by said motion vector processor, and for altering said motion vector in response to said detection.

9. Apparatus according to claim 1, in which said output compressed video signal has an "IBBPBBPBBPBB" GOP structure.

10. Apparatus according to claim 1, in which said input compressed video signal has an "IB" GOP structure.

11. Apparatus according to claim 9, in which said input compressed video signal has an "IBBPBBPBBPBB" GOP structure.

12. A method of digital video processing in which an output compressed video signal is derived from an input compressed video signal;
  (i) said input compressed video signal representing successive input pictures, in which subsets of said pictures are derived from other input pictures in accordance with a repetitive group of pictures (GOP) structure, using input picture motion vectors;
  (ii) said output video signal representing successive output pictures, in which subsets of said pictures are derived from other pictures in accordance with a repetitive GOP structure different to or not picture-aligned with that of said input compressed video signal, using output picture motion vectors;
    said method comprising deriving said output picture motion vectors from said input picture motion vectors and comparing magnitudes of respective output picture motion vectors with a test magnitude;
    whereby said test magnitude is an average magnitude of a plurality of motion vectors associated with surrounding picture areas; and
    whereby said comparing includes determining whether the magnitudes of said output picture motion vectors differ from said average magnitude by more than a predetermined percentage.

13. Digital video processing apparatus in which an output compressed video signal is derived from an input compressed video signal;
  (i) said input compressed video signal representing successive input pictures, in which subsets of the pictures are derived from other input pictures in accordance with a repetitive group of pictures (GOP) structure, using input picture motion vectors;
  (ii) said output video signal representing successive output pictures, in which subsets of said pictures are derived from other pictures in accordance with a repetitive GOP structure different to or not picture-aligned with that of said input compressed video signal, using output picture motion vectors;
    said apparatus comprising a motion vector processor for deriving said output picture motion vectors from said input picture motion vectors, a correlation detector for detecting correlation of blocks of pixels pointed to by a motion vector generated by said motion vector processor and for altering said motion vector in response to said detection, and a motion vector tester for comparing magnitudes of respective motion vectors output by said motion vector processor with a test magnitude;
    whereby said test magnitude is an average magnitude of a plurality of motion vectors associated with surrounding picture areas; and
    whereby said comparing includes determining whether the magnitudes of said output picture motion vectors differ from said average magnitude by more than a predetermined percentage.

14. A method of digital video processing in which an output compressed video signal is derived from an input compressed video signal;
  (i) said input compressed video signal representing successive input pictures, in which subsets of the pictures are derived from other input pictures in accordance with a repetitive group of pictures (GOP) structure, using input picture motion vectors;
  (ii) said output video signal representing successive output pictures, in which subsets of said pictures are derived from other pictures in accordance with a repetitive GOP structure different to or not picture-aligned with that of said input compressed video signal, using output picture motion vectors;
    said method comprising the steps of deriving said output picture motion vectors from said input picture motion vectors, detecting correlation of blocks of pixels pointed to by a motion vector generated in said step of deriving, altering said motion vector according to said step of detecting, and comparing magnitudes of respective output picture motion vectors with a test magnitude;
    whereby said test magnitude is an average magnitude of a plurality of motion vectors associated with surrounding picture areas; and
    whereby said comparing includes determining whether the magnitudes of said output picture motion vectors differ from said average magnitude by more than a predetermined percentage.

* * * * *